United States Patent [19]

Tamosauskas

[11] 4,341,677

[45] Jul. 27, 1982

[54] ANTIOXIDANTS AND REINFORCED POLYMERS AND OIL-IN-WATER EMULSIONS OF ANTIOXIDANTS

[75] Inventor: Albert E. Tamosauskas, Pittsburgh, Pa.

[73] Assignee: PPG Industries, Inc., Pittsburgh, Pa.

[21] Appl. No.: 190,153

[22] Filed: Sep. 24, 1980

Related U.S. Application Data

[62] Division of Ser. No. 137,063, Apr. 3, 1980.

[51] Int. Cl.$^3$ ............................................. C08L 63/02
[52] U.S. Cl. ...................................... 523/421; 65/3.43; 428/378; 524/310; 524/110; 524/291; 524/258; 524/375; 524/591; 524/598
[58] Field of Search ................. 260/29.2 EP, 29.2 TN, 260/29.4 R; 65/3.43, 3.44; 428/378

[56] References Cited

U.S. PATENT DOCUMENTS

| | | | |
|---|---|---|---|
| 2,046,555 | 7/1936 | Gill | 428/375 |
| 2,269,529 | 1/1942 | Goldsmith | 252/310 |
| 2,628,930 | 2/1953 | Zentner | 167/81 |
| 2,871,219 | 1/1959 | Baggett et al. | 260/45.9 P |
| 3,082,183 | 3/1963 | Boyd | 260/29.6 |
| 3,249,412 | 5/1966 | Kolek et al. | 260/29.2 EP |
| 3,285,855 | 11/1966 | Dexter et al. | 252/57 |
| 3,330,859 | 7/1967 | Dexter et al. | 260/473 |
| 3,424,725 | 1/1969 | Fischer et al. | 260/45.9 P |
| 3,461,090 | 8/1969 | Haynes | 260/17.4 |
| 3,484,223 | 11/1969 | Vanderbilt et al. | 65/3 |
| 3,556,754 | 1/1971 | Marsden et al. | 65/3 |
| 3,578,594 | 5/1971 | Dombrow | 252/8.9 |
| 3,635,834 | 1/1972 | Cilento et al. | 252/314 |
| 3,644,141 | 2/1972 | Preston | 117/126 GS |
| 3,793,132 | 2/1974 | Bhakuni et al. | 161/144 |
| 4,073,762 | 2/1978 | Hosoda et al. | 260/29.3 |
| 4,093,774 | 6/1978 | Hartless et al. | 428/379 |
| 4,134,841 | 1/1979 | Park et al. | 252/8.9 |
| 4,177,177 | 12/1979 | Vanderhoff et al. | 260/29.2 M |
| 4,219,463 | 8/1980 | Minagawa et al. | 260/45.85 B |

FOREIGN PATENT DOCUMENTS

| | | |
|---|---|---|
| 810699 | 4/1969 | Canada ............................ 260/476 |
| 406642 | 8/1932 | United Kingdom . |
| 952512 | 3/1964 | United Kingdom . |
| 1036951 | 7/1966 | United Kingdom . |
| 1352947 | 5/1974 | United Kingdom . |
| 1399656 | 7/1975 | United Kingdom . |
| 1519041 | 7/1978 | United Kingdom . |
| 1565823 | 4/1980 | United Kingdom . |

OTHER PUBLICATIONS

"Vanderbilt News", vol. 34, No. 2, 1972, pp. 13-24.
"Naugard 445", Antioxidant Data Sheets.
"Ethyl Antioxidant 330", Product Literature.
"Irganox 1076", Product Data Sheets.
"Irganox 1010", Product Information Bulletin, Apr. 1979.
"Topanol CA Antioxidant", Information Bulletin.
"Emulsification of LSU 520", Product Data Bulletin.
"Emulsifiable Epoxy Resins", Bulletin from Ciba-Geigy Corporation.
The Merck Index, Ninth Edition, Published by Merck & Co., Inc., 1976, p. 1290.
The Condensed Chemical Dictionary, Tenth Edition, Revised by Gessner G. Hawley, Van Nostrand Reinhold Company, p. 91.
Calculation of HLB Values of Non-Ionic Surfactants by William C. Griffin, The American Perfumer, p. 26, May 1955.

*Primary Examiner*—Theodore E. Pertilla
*Attorney, Agent, or Firm*—Kenneth J. Stachel

[57] ABSTRACT

Oil-in-water emulsions of antioxidants having low volatility and good thermal resistance are provided for treating fibrous reinforcements such as glass fibers. The emulsions are comprised of the antioxidant in an amount of about 5 to about 60 weight percent of the emulsion along with an organic solvent that has a boiling point above the temperature of use or of preparation and is compatible with the antioxidant in an amount in a ratio of about 0.5 to about 1.5 with the antioxidant and one or more emulsifiers selected from the group consisting of anionic, and nonionic having a combined HLB (hydrophilic/lipophilic balance) in the range of about 12 to about 27. The emulsion can also contain a resin carrier such as an epoxy resin and/or a stabilizing agent such as polyalkylene polyol.

An aqueous treating solution for treating fibrous reinforcement such as a sizing composition for treating glass fibers to increase the protection of fiber reinforced polymeric materials against chemical degradation due to the chemistry on the treated glass fibers or reaction and/or decomposition products of said chemistry is comprised of the oil-in-water emulsion, film-former, and coupling agent and may contain other conventional agents used in sizing composition.

20 Claims, No Drawings

ANTIOXIDANTS AND REINFORCED POLYMERS AND OIL-IN-WATER EMULSIONS OF ANTIOXIDANTS

This is a division of application Ser. No. 137,063, filed Apr. 3, 1980.

BACKGROUND OF THE INVENTION

The present invention is directed to approaches to increase the performance of fiber reinforced polymers under aging conditions including the use of oil-in-water emulsions of antioxidants that are water insoluble or immiscible or have limited water solubility, wherein the emulsions have a small particle size and good stability.

More particularly, the present invention is directed to methods and compositions for increasing the performance of glass fiber reinforced polymers under thermal aging conditions. The compositions include the use of oil-in-water emulsions of antioxidants that are water insoluble or immiscible or have limited water solubility and that are of low volatility and good thermal stability and non-discoloring for use in treating glass fibers. The oil-in-water emulsion provides a method to reduce chemical degradation of polymers reinforced with glass fibers containing sizing compositions.

In order to stabilize polymers from degradation due to oxygen and ozone, various antioxidants of the hindered phenol and diaryl amines types have been incorporated into polymer formulations. Another type of degradation that polymers may encounter is degradation due to various chemicals other than oxygen and ozone with which the polymers may come in contact. Such chemical degradation may occur when the polymers are reinforced with material that has been treated with various chemicals to provide efficient processing of the materials and to provide compatibility of the materials with the polymers. Care must be taken in producing reinforcement materials containing treatment chemicals, such as sizing compositions for glass fibers, to avoid any problem of interaction between the chemistry on the reinforcing material and the polymers. Any possible interaction between the various chemical agents in the system or reaction or decomposition products of these chemical agents with the polymer may degrade the polymer to some degree. This degradation would reduce the mechanical properties of the reinforced polymer over time and especially under thermal aging conditions. When the reinforced polymer is subjected to elevated temperatures for a period of time, i.e., thermal aging, degradation of the polymer may be accelerated due to thermal autooxidation and increased reaction rates for chemical interaction. This degradation shortens the useful properties of the reinforced polymer which usually have extended properties due to the presence of the reinforcement.

Antioxidants that have been added to polymer compositions that are to be used in preparing reinforced polymers have also been added in the form of the antioxidant alone as a solid or liquid. Also, antioxidants have been added to latex formulations such as rubber latices in the form of emulsion and dispersions. For example, the antioxidant "Age Rite Resin D" available from R. T. Vanderbilt Company, Inc. which is the antioxidant polymerized 1,2-dihydro-2,2,4-trimethyl quinoline can be prepared in a 30% emulsion by melting the "Age Rite Resin D" antioxidant in light process oil and oleic acid at 104° C. and removing the mixture from the heating source and adding xylol. Then the emulsifier nonylphenoxy poly(ethyleneoxy)ethanol available from GAF Corporation Chemical Products under the trade designation "Igepal CO-630" is diluted. Dissolved potassium hydroxide pellets are mixed with the emulsifier and the mixture is heated to about 88° C. The emulsifier mix is then added to the antioxidant mix with vigorous agitation to produce an emulsion having about 32.1 percent oil to 31.8 percent water. Other similar emulsions and dispersions are available in the publication "Vanderbilt News" volume 34, number 2, 1972, pp 13–24.

An emulsion is a two phase system consisting of two incompletely miscible liquids, the one being dispersed as fine droplets in the other, whereas a suspension is a two phase system where the dispersed phase is a solid. As stated above both emulsions and dispersions of antioxidants have been used in formulations for rubber latices. The stability of antioxidant emulsions depends upon the factors for emulsions in general: (1) particle size, (2) difference between the densities of the material in the internal phase, which is the liquid broken into droplets and of the material in the external phase, which is the surrounding material, (3) the viscosity of the emulsion concentrate, (4) the charges on the particles, (5) choice of emulsifier type and amount of emulsifier used, and (6) the conditions of storage such as agitation, temperature, dilution, and evaporation.

Additional applications of antioxidant emulsions may be developed if the emulsions have a small average particle size of around 1.5 microns and a sufficiently narrow particle size distribution. Such additional application can be found in the coating industry where coating or treating solutions for various materials would benefit from a small average particle size, fairly narrow particle size distribution antioxidant emulsion. Antioxidants that would be particularly useful in a small average particle size, fairly narrow particle size distribution emulsion would be those that are of low volatility, and/or heat resistant and/or non-discoloring.

It is an object of the present invention to provide an oil-in-water emulsion of an antioxidant and especially antioxidants of low volatility, and/or heat resistant, and/or non-discoloring that has an average particle size of less than 1.5 microns, a fairly narrow particle size distribution, good stability and good dilutability to a low concentration.

It is an additional object of the present invention to provide a treating composition for glass fibers that are to be used for reinforcement of various polymeric materials and that reduce degradation of the reinforced polymer due to an interaction between the chemicals in the treating composition or their reaction or decomposition products and the polymeric material.

It is a further additional object of the present invention to provide a method for reducing degradation of a glass fiber reinforced polymer due to any interaction between the materials present in the sized glass fiber strand and/or reaction or thermal decomposition products thereof under thermal aging conditions, thereby reducing any decrease in mechanical properties of the reinforced polymer due to such degradation.

SUMMARY OF THE INVENTION

In accordance with the present invention, the aforementioned objects and other objects which are inherent from the following discussion are achieved by having a method for reducing chemical degradation of polymers due to chemical interaction between chemicals in the sizing composition of the reinforcement and/or chemical reaction or thermal decomposition products of said chemicals and the polymer by adding an antioxidant either to the treating composition for the reinforcement or adding an additional amount of one or more antioxidants with low volatility and good heat resistance to the polymeric material.

The treating composition for the reinforcement such as sizing compositions used with glass fibers, has the antioxidant present in the form of an oil-in-water emulsion that has a small average particle size and a fairly fine particle size distribution in order that the treating composition adequately coats the surface of the reinforcement. The treating composition can contain other components that are conventionally used in treating compositions for glass fibers. Non-exclusive examples of these include coupling agents, film-formers, lubricants, surfactants, and the like.

The oil-in-water emulsion of the antioxidant allows for high concentrations, up to about 60 weight percent of the aqueous emulsion, of the water immiscible or water insoluble or limited water soluble and miscible hindered phenol or diaryl amine antioxidant with low volatility and good thermal resistance and good polymer compatibility. The emulsion also has an organic solvent that is fugitive at just above ambient temperatures to temperatures greater than those just above the temperature used to treat and process the reinforcement treated with the emulsion. The emulsion also has one or more emulsifiers or emulsifier blend wherein the hydrophilic/lipophilic balance (HLB) for the emulsifier or blend is in the range of about 12 to about 27.

Low volatility refers to the antioxidant having a percent weight loss measured by thermal gravimetric analysis (TGA) of less than about 20 percent when about 6 mg of antioxidant is heated to 250° C. and held for 30 minutes. This assures the presence of a sufficient amount of anti-oxidants in the reinforced polymer.

The good heat or thermal resistance or stability of the anti-oxidant refers to the antioxidant not decomposing in any way to lose its effectiveness at temperatures of less than around 200° F. (93° C.).

The compatibility between the antioxidant and the polymer to be reinforced refers to the antioxidant having the capability of forming secondary bonds such as hydrogen bonding, Van der Waals bonding, and dipole interactions and ionic bonding with the polymers. If the antioxidant is very compatible with the polymer and has a high degree of at least secondary bonds, the volatility of the antioxidant can approach the upper limit of weight loss.

In general, the process of this invention comprises the following. The oil-in-water antioxidant emulsion is prepared. The aqueous treating solution containing the emulsion is prepared with at least a film-former and coupling agent and optionally a lubricant and other conventional sizing additives used to treat glass fibers. The glass is formed into glass fiber strands, and during the formation the aqueous treating solution is applied to the glass fibers. The treating solution, also known as a sizing composition, in contact with the glass is dried to remove moisture and the fugitive organic solvent. The dried, treated glass fibers are used in any form as reinforcement for polymeric materials.

In addition to incorporating the antioxidant into the reinforced polymer by use of the oil-in-water emulsion, the low volatile, heat resistant antioxidant may be incorporated into the polymer during polymerization and/or dry compounding to prepare the fiber reinforced polymer. This addition is in excess of the usual amount of antioxidant added to the polymer formulations. Usually less than 1 part per hundred parts of polymer up to around 3 parts per hundred of polymer are added to polymer formulations. This addition protects the polymer during processing and in use from degradation due to oxygen, ozone and water. The additional amount in excess of that added for such protection protects a fiber reinforced polymer from chemical degradation. The chemical degradation is that associated with interactions of chemicals in treating solutions and/or reaction and/or thermal degradation products thereof used to treat the reinforcement material.

DETAILED DESCRIPTION OF THE INVENTION

Although the theory of the degradation of the reinforced polymer is not completely understood, it is believed that there is a chemical interaction between the chemical compounds of the sizing composition on the glass fibers or reaction products and/or thermal decomposition products of these chemicals and the polymer. This interaction leads to chemical degradation of the polymer over and above any degradation due to oxygen, ozone and/or water. This chemical degradation is especially prevalent when the reinforced polymer is subjected to elevated temperatures and thermal aging. It is believed that the degradation is more than thermal autooxidation, since the molding of the fiber reinforced polymers takes place in closed molds that would reduce the amount of oxygen present, and since the reinforcement such as glass fiber contains little, if any, moisture because the glass fibers have been dried to reduce their moisture content before the molding operation is performed. It is further believed that certain types of compounds present in the treating solution and on the dried treated glass fibers may be subject to thermal degradation at conditions that are milder than those conditions that cause polymer degradation. It is believed that an example of these compounds are the polyoxyalkylene type compounds that are used as nonionic emulsifiers in the treating solutions.

It has been discovered that the addition or incorporation of hindered phenolic or diaryl amine antioxidants having low volatility, good thermal stability and good polymer compatibility into the polymer or into as aqueous sizing composition for treating glass fibers during their formation reduces the amount of chemical degradation of the fiber reinforced polymer. The reduction in chemical degradation extends the mechanical properties and service life of the fiber reinforced polymers and this is especially so under conditions of thermal aging.

The types of hindered phenolic and/or diaryl amine antioxidants that can be used include the non-exclusive examples of high molecular weight hindered phenolic compounds, high molecular weight hindered bis-phenolic compounds, high molecular weight hindered phenolic amines, high molecular weight hindered mono-phenolic compounds; 3,5-di tert butyl-4 hydroxy hydrocinnamic acid triester with 1,3,5-tris(2-hydroxy ethyl)-bis triazine-2,4,6(1H, 3H, 5H)-trione; alkylated phenols and bis-phenols and phenol condensation products such as a 3:1 condensate of 3 methyl, 6 tertiary butyl phenol with croton-aldehyde; tetra-functional hindered phenols such as tetrakis(methylene 3-) 3', 5'-di-t-butyl-4' hydroxy phenyl (propionate) methane; octadecyl(di-t-butyl hydroxy phenyl propionate) and other such phenolic compounds having the following structure:

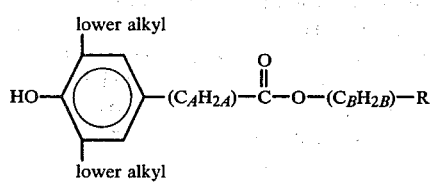

wherein A has a value of from 0 to 6 inclusively and B has a value from 2 to 30 inclusively and R is a member consisting of hydrogen, hydroxy, such as the following compounds 1,2-propylene glycol bis-[3,5-di-t-butyl-4-hydroxyphenyl)-propionate]; ethylene glycol bis[3-(3,5-di-t-butyl-4-hydroxyphenyl)propionate]; neopentyl glycol bis[3-(3,5-di-t-butyl-4-hydroxyphenyl)propionate]; ethylene bis (3,5-di-t-butyl-4-hydroxyphenyl acetate; glycerine-[n-octadecanoate-2,3-bis-(3,5-di-t-butyl-4-hydroxyphenyl acetate)]; sorbitol hexa-[3(3,5-di-t-butyl-4-hydroxyphenyl)propionate]; 2-hydroxyethyl 7-(3-methyl-5-t-butyl-4-hydroxyphenyl)heptanoate; N,N'-hexamethylene bis (3,5-di-tert-butyl-4-hydroxy)-hydrocinnamamide and the like; polybutyl bisphenol; esters of ethoxylated aryl phenols and bis aryl phenols such as the acetate ester of the condensation of 5 moles of ethylene oxide with 1 mole of benzylphenol; the lauric ester of the condensation product of 24 moles of ethylene oxide and 1 mole of bis benzylphenol; the stearate ester of the condensation product of 10 moles of ethylene oxide and 1 mole of alpha methyl benzylphenol; neutral adipate esters of the condensation product of 2 moles of ethylene oxide with 1 mole of alpha, alpha' dimethyl benzylphenol; the dipelargonate ester of the condensation product of 17 moles of ethylene oxide and 1 mole of bis methyl benzylphenol; the neutral malonate ester of the condensation product of 8 moles of ethylene oxide with 1 mole of alphaphenyl-benzyl-phenol; the palmitate ester of the condensation product of 3 moles of ethylene oxide with 1 mole of alpha methyl benzylphenol and the like; condensation products of oxalyl dihydrazide and 3-tertiary butyl-4-hydroxy aryl carbonyl compounds such as 3,5-ditertiary butyl-4-hydroxybenzaldehyde. Especially useful are the antioxidants like tetrakis(methylene 3-3', 5'-di-t-butyl-4' hydroxy phenol)propionate methane, substituted diphenyl amine like 4,4'-[2-(2-phenyl)propyl]diphenylamine; a 3:1 condensate of 3 methyl, 6 tertiary butyl phenol with croton aldehyde and octadecyl 3-(3', 5'-di-tert-butyl-4-hydroxy phenyl) propionate and the like; condensation product of oxalyl dihydrazide and 3,5-di-tertiary-butyl-4-hydroxy aryl carbonyl compounds; esters of ethoxylated aryl phenols and 1,3,5-trimethyl-2,4,6-tris[3,5-di-tert butyl-4-hydroxybenzyl]-benzene. The aforementioned antioxidants that benefit most from the present invention are those that are water immiscible or water insoluble.

When any of the aforementioned antioxidant stabilizers have a high degree of compatibility with monomers polymerized to produce polymers to be reinforced with fibrous materials, the antioxidant stabilizer can be added directly to the polymer to overcome the chemical degradation due to chemical compounds present on the fibrous reinforcement material or their chemical and/or thermal degradation products.

Synthetic organic polymeric substances which are to be reinforced with fibrous materials, useful with the present invention, include the non-exclusive examples of vinyl polymers such as poly-alpha-olefins such as polyethylene, polypropylene, polybutylene, polyisoprene and the like including copolymers of poly-alpha-olefins; polyurethanes such as are prepared from polyols and organic polyisocyanates; polyamides such as polyhexamethylene adipamide; polyesters such as polymethylene terephthalates and polybutylene terephthalates and polyethylene and polypropylene terephthalates; polycarbonates, poly-acetals, polystyrene, and copolymers such as those of a high impact polystyrene containing copolymers or butadiene and styrene and those formed by the copolymerization of acrylonitrile, butadiene and/or styrene.

In general, small amounts of the antioxidant stabilizers are added to the polymers during polymerization, although larger amounts are added to polymers during formulations, compounding and fabrication and final manufacture of the reinforced polymeric material. In general, the antioxidants are employed in an amount of from about 0.005 percent to about 3 percent by weight based upon the stabilized composition. In polypropylene, amounts of from about 0.01 percent to about 3 percent by weight are advantageous with from about 0.01 to about 1 percent by weight being especially preferred. Therefore, the amount of antioxidant stabilizer needed to overcome the chemical degradation of any compounds on the reinforcement material to be used for reinforcing the polymer or the reaction and/or decomposition products of the compounds must be an extra amount in the range of about 0.25 to about 1.0 part per hundred parts of polymer and reinforcement that is added to the polymer that may already have up to 3 percent of some type of antioxidant. This additional amount of antioxidant can be added to the polymer to be reinforced at any time before the final production of the reinforced polymeric material. It is most advantageous to add the additional amount of antioxidant to the polymerized polymer that is ready to be compounded with the reinforcement, preferably glass fibers are used to produce the reinforced polymeric material. The antioxidant can be added in any form such as the solid form, liquid or as an emulsion or dispersion in aqueous or non-aqueous solvents.

When the additional amount of the antioxidant is incorporated into the aqueous treating solution or sizing compound placed on the reinforcing material such as glass fibers, the antioxidant is added to the treating solution for the glass fibers as an oil-in-water emulsion. The aqueous emulsion is necessary in order to provide near uniform coating of the glass fibers as they are formed. In order to reduce the amount of degradation of polymeric materials that are reinforced with fibrous reinforcement having chemical agents present that upon thermal aging cause chemical degradation in the polymer, the amount of antioxidant present in the emulsion should be in the range of about 5 to about 60 weight percent of the emulsion.

The oil-in-water emulsion of the aforementioned antioxidants that are water immiscible or water insoluble comprises in addition to the antioxidant one or more organic solvents and one or more emulsifiers.

The organic solvent will vary with the different antioxidants used in such a way that if the antioxidant is predominantly aliphatic the organic solvent will have a low kauri-butanol value such as from about 10 to about 50 and have a boiling range within the range of from ambient temperatures to about 250° C. where the boiling point is above the temperature of use for the emulsion that is the treating of glass fibers with aqueous sizing compositions. If the antioxidant has more than about 60 percent aromaticity the acceptable organic solvent will have a kauri-butanol value of from about 50 to about 100 with a boiling range which lies within the range of about ambient temperature to about 250° C. and which is above the temperature of use for the emulsion. The use of organic solvents with a boiling point above 250° C. is not advantageous since the solvent is to be removed after the reinforcement is treated. When the organic solvent has a boiling point below around 100° C. to around 150° C., the use of suction equipment to control the escaping vapor is necessary.

The kauri-butanol number is a measure of solvent power of petroleum thinners where the value is the number of milliliters of solvent required to cause cloudiness when added to 20 grams of a solution of kauri gum in butyl alcohol. The solution is prepared in the proportion of 100 grams of kauri gum and 500 grams of butyl alcohol. Solvents of low aromatic content are strong precipitants for the resin, and therefore, give low values. Conversely the solvents having a high aromaticity give high values. The kauri-butanol numbers are preferably determined against one of two standards where the one standard is a one degree toluene with a value of 105 used when the organic solvent is a kauri-butanol value over 60, and the other standard is a mixture of 75 percent of N-heptane and 25 percent toluene when the organic solvent has a kauri-butanol number of 40. This is discussed in ASTM Standard D.1133-54T.

Organic solvents from which the low and high kauri-butanol solvents are selected are solvents such as aliphatic hydrocarbons, aromatic hydrocarbons, esters, ethers, alcohols, ketones, petroleum distillates and coal tar distillates and mixtures thereof. Examples of organic solvents with low kauri-butanol numbers useful when the antioxidant has a substantial amount of aliphatic components are the isoparaffinic hydrocarbon solvents. Suitable examples are those of the series of commercially available isoparaffinic hydrocarbon solvents sold by EXXON Company USA under the trademark "ISOPAR" or Philips Petroleum under the trademark "SOL-TROL" which have boiling ranges within the above ranges. Examples of organic solvents with a high kauri-butanol value include the solvent commercially available under the trade name "HI-SOL-10" or "HI-SOL-15" available from Ashland Chemical Company, Ohio. The "HI-SOL-10" solvent has a boiling point of 308° F. (150° C.) and a flash point of 105° F. (40.6° C.) and an evaporation rate of 25.0 using an ether base of 1. Also, the organic solvent sold by EXXON Company USA, Division of EXXON Corp. Co. under the name "SOL-VESSO 150" or "SOLVESSO 100" can be used. Additional examples of organic solvents that can be used in forming the antioxidant oil-in-water emulsion of the present invention are the following non-exclusive examples xylene, methyl ethyl ketone, cyclohexanone, cyclopentanone, methyl isobutyl ketone, toluol, ethyl cellosolve, toluene, butyl carbitolacetate, butyl cellosolve acetate, trichloroethylene, methylene chloride, amylacetate, ethyl acetate, and the like.

The ratio of the antioxidant to the organic solvent will vary depending on the particular antioxidant and solvent employed, but generally the ratio will be in the range of at least about 60 to about 40 of antioxidant to solvent and preferably up to about 40:60 and most preferably about 50 to about 60. Less solvent will be needed if the organic solvent has a higher kauri-butanol number when the antioxidant has substantial aromaticity and when the kauri-butanol number approaches 50, when the antioxidant has a substantial amount of aliphatic character. The amount of the organic solvent used in making up the emulsion of the antioxidant will generally vary within the range of about 1 to about 50 percent by weight of the emulsion. More solvent can always be added, but there is no benefit to such practice since the solvent is usually removed at some later time.

The one or more emulsifiers of the present invention is selected from nonionic emulsifiers or a mixture of one or more nonionic emulsifiers with an anionic emulsifier. When more than one emulsifier is used, the emulsifiers constitute an emulsion blend of at least two emulsifiers. The emulsifiers are selected to give a hydrophilic-lipophilic balance (HLB value) for the emulsifier or emulsifier blend in the range of about 12 to about 27. Non-exclusive examples of chemical types of emulsifiers for use in the blend of emulsifiers are nonionic emulsifiers such as ethoxylated alcohols, ethoxylated alkyl phenols, ethoxylated fatty acids, ethoxylated fatty esters and oils, fatty esters, glycerol esters, glycol esters, monoglycerides and derivatives, sorbitan derivatives, sucrose esters and derivatives, alkylene glycol ethers, alkyl polyether alcohol, alkyl aryl polyether alcohol, and polyoxide alkyl condensates. Non-exclusive examples of the anionic emulsifiers include alkyl sulfonates, phosphate esters, polyaminocarboxylic acids and related sequestering agents, succinates sulfo derivatives, alcohol sulfates, ethoxylated alcohol sulfates, sulfates and sulfonates of ethoxylated alkyl phenols, oils and fatty esters and the like. The amount of the emulsifier or emulsifier blend added to the emulsion is in the range of about 3 to about 15 weight percent of the emulsion.

In addition to the antioxidant, organic solvent and one or more emulsifiers, the emulsion contains an amount of water that is necessary to make the emulsion an oil-in-water emulsion which is generally in the range of about 28 to about 70 weight percent. If the emulsion is to be shipped for any considerable distance, it is most practical to add just the amount of water needed to make the emulsion an oil-in-water emulsion that is actually a concentrated emulsion that can be further diluted at the location of use.

In preparing the emulsion of the present invention, one or more of the aforementioned antioxidants is dissolved in one or more of the fugitive organic solvents suitable for the particular antioxidants involved. Also, the antioxidant or antioxidants may be melted and then added to the fugitive organic solvent. The mixture of the one or more antioxidants with one or more organic solvents may be subjected to moderately elevated temperatures to facilitate solubilization of the antioxidants. The mixture of the antioxidant dissolved in the organic solvent has added to it the one or more emulsifiers, and this mixture is emulsified using standard techniques, conditions and apparatus. Such standard techniques include the direct method of preparing an emulsion or the indirect method of preparing an emulsion wherein water is added until the oil inverts into an oil-in-water emulsion. The amount of water added to the organic solution of the antioxidant and emulsifier blend is that to give an emulsion containing from about 28 to about 70 percent by weight water. The homogenizing action can be carried out in a variety of equipment which can subject the aqueous organic mixture to high shear forces. An example of such equipment is an Eppenbach colloid mill with a gap setting at 20. A Manton-Gaulin homogenizer can be used also at pressure of 3000 to 6000 p.s.i. (210 to 420 kg/cm$^2$). The emulsifier or emulsifier blend can be added to the mixture of one or more antioxidants and one or more organic solvents by adding the emulsifier separately to the mixture or by adding any combination of the emulsifiers. After the emulsifiers are added, the resulting mixture is dilluted slowly with water according to the invert emulsion technique, where the water can be at ambient temperature or at some elevated temperature. The water is added slowly until the emulsion inverts to an oil-in-water emulsion and then the emulsion is cooled to ambient conditions. During the cooling operation or afterwards additional water is added to bring the emulsion to the desired concentration. The amount of water added to the emulsion is at least about 28 weight percent of the emulsion composition.

One usage for the antioxidant emulsion which is particularly beneficial is the use in a treating solution for glass fibers. The emulsion has a fine droplet or particle size sufficient to allow for near uniform coating of the treating solution on the glass fiber surface. The oil-in-water antioxidant emulsion can be formed into an aqueous treating solution or as termed in the art a sizing composition, for glass fibers by combining the emulsion with sizing composition ingredients such as film formers, coupling agents, lubricants and perhaps additional components such as softeners, wetting agents, antifoaming agents and additional surfactants. This formation can involve slowly adding the emulsion to an aqueous mixture containing one or more coupling agents and any lubricants or softening agents and film formers and the remaining water to make the aqueous sizing composition. It is also possible to add the one or more coupling agents, lubricants, softening agents, film formers, or other sizing agents to a mixture containing the emulsion alone or the emulsion and any one or more of the aforementioned sizing composition ingredients. Once the emulsion of the present invention is prepared, the aqueous sizing composition can be made in any manner known to those skilled in the art. For example, the amounts of coupling agents, lubricants, film-formers and other sizing ingredients can generally be in the following ranges.

| coupling agent | about 0.5 to about 10 |
| lubricant | about 0.001 to about 1 |
| film-former | about 0.5 to about 15 |

The aqueous sizing composition is applied to individual glass fibers during their formation by any conventional method of applying sizing compositions to glass fibers. The glass fibers are attenuated from molten streams of glass which can be an E glass or 621 glass composition or any low polluting derivative thereof. Such methods are shown in U.S. Pat. No. 4,027,071 (Motsinger) which is incorporated by reference.

Sized glass fibers are dried to remove moisture and the fugitive organic solvent. The drying can be accomplished by air drying or drying in a heated over. The dried sized glass fibers can be used in any form such as fibers, strands, wet or dry chopped strands, mats and the like for reinforcing polymers such as polyamides, like Nylon 6; polyesters, like polybutyleneterephthalate; polyolefins like polyethylene, polypropylene and copolymers thereof and the like.

PREFERRED EMBODIMENT

In the preferred embodiment of the present invention, the antioxidant used to overcome chemical degradation of a reinforced polymeric material due to chemical interaction between chemical compounds present on the fibrous reinforcement or the compounds reaction or thermal degradation products and the polymer is added to the aqueous treating solution for the fibrous material which is preferably glass fibers. It is preferred to incorporate the antioxidant into the aqueous treating solution by a combination of the oil-in-water antioxidant emulsion with other components to prepare the aqueous treating solution.

In the preferred oil-in-water emulsion the antioxidants used have fairly low volatility, good thermal stability, and good polymer compatibility. The preferred emulsion uses about 5 to 60 and most preferably about 5 to about 25 weight percent of octadecyl 3-(3', 5'-di-tert-butyl-4-hydroxyphenyl, propionate) available from Ciba Geigy Corporation under the trade designation "IRGANOX 1076". This antioxidant which is a white, crystalline, free-flowing powder with a melting range between 50° and 55° C. and a molecular weight of around 531 is dissolved preferably in about a 1 to 1 ratio with xylene. To this mixture there is added about 3 to about 15 preferably 3 to about 12 weight percent of an emulsifier blend. It is preferred that the emulsifier blend be a combination of three emulsifiers that when used in certain weight ratios to each other give a total HLB for the emulsion blend in the range of about 12 to about 27. It is preferred that one emulsifier have a high HLB value in the range of about 12 to about 27. Another emulsifier has a lower HLB value in the range of about 6 to about 12 and another emulsifier has an HLB value in the middle range of about 9 to about 18. It is particularly useful to use the emulsifiers in equal proportions, although any proportion of the various emulsifiers can be used to give the desired HLB range.

It is most preferred to have a first emulsifier which is a trimethyl nonyl polyethyleneglycol ether such as that commercially available from Union Carbide Corporation under the trade designation "TERGITOL TMN-6" having an HLB of 11.7. This ether is used in an amount of about 1 to about 5 weight percent of the emulsion. The ether emulsifiers combined with another emulsifier which is nonyl phenoxy polyethyleneoxy ethanol, commercially available from GAF Corporation Chemical Products under the trade designation "IGEPAL CO-630" having an HLB of 13 and used in an amount of about 1 to about 5 weight percent of the aqueous emulsion. These two emulsifying agents are combined and stirred until clear. Then another emulsifying agent which is a condensate of ethylene oxide with hydrophobic bases formed by condensing propylene oxide with propylene glycol and is commercially available from BASF Wyandotte Industrial Chemical Corporation under the trade designation "Pluronic-P-65" which has an HLB of 17 is used in an amount in the range of about 1 to about 5 weight percent of the aqueous emulsion composition.

It is preferred to add the emulsifier blend in the following manner. A mixture of the ether emulsifying agent and ethanol emulsifying agent are combined with the mixture of the antioxidant and organic solvent. The polyoxyalkylene oxide block copolymer emulsifier is split into two portions, preferably around a 50/50 split wherein the first portion is added to the mixture of the emulsifiers, antioxidant and solvent, and the second portion is added to water preferably in around a 50/50 blend and then this portion of the oxide block copolymer emulsifier in water is combined with the emulsifier, antioxidant, solvent mixture. The final mixture is then agitated with the addition of an amount of warm water of about 25 to about 30° C. in the range of about 15 to about 30 weight percent of the aqueous emulsion. Then an amount of cold water is added to give an amount of active antioxidant in the range of about 5 to about 25 weight percent to produce the aqueous emulsion.

In an alternative embodiment, the antioxidant tetrakis(methylene-3-3',5'-di-t-butyl-4'-hydroxy phenyl)-propionate methane available from Ciba Geigy Corporation under the trade designation "IRGANOX 1010" antioxidant is dissolved in an amount of about 5 to about 20 weight percent of the emulsion in the organic solvent methyl ethyl ketone. The amount of methyl ethyl ketone used is in the range of around a 1 to 1 ratio with the antioxidant. The emulsifer blend is combined with this mixture by any of the aforementioned manners of addition. The emulsifier blend comprises the emulsifier polyoxyethylene (4) sorbitan monolaurate (Tween 21 available from ICI Americas, Inc.) wherein the amount of the monolaurate emulsifier is in the range of about 1 to about 5 weight percent. Another emulsifier that is used is a condensate of ethylene oxide with hydrophilic bases formed by condensing propylene oxide and propylene glycol which is available from BASF Wyandotte under the trade designation "Pluronic F-85" having an HLB of 24 and used in an amount of about 1 to about 5 weight percent. Another emulsifier that is used is the polyethoxylated vegetable oil available from GAF Corporation under the trade designation "EMULPHOR EL-719" having an HLB of 13.6 and used in an amount of about 1 to about 5 weight percent. In addition to the antioxidant, the methyl ethyl ketone, and the emulsifiers, an amount of polyalkylene polyol lubricant available under the trade designation "Pluracol V-10" available from BASF Wyandotte Corporation is added to the emulsion in an amount of about 1 to about 5 weight percent. This lubricant is added to give the emulsion additional stability. This lubricant can also be added to the sizing composition rather than to the emulsion. The polyalkylene glycol "Pluracol V-10" is a viscous, high molecular weight, liquid with a specific gravity at 25/25° C. by BWC Test of 1.089 with a flash point by ASTM D92-52 of 510° F. To the mixture of the antioxidant, methyl ethyl ketone, monolaurate, oxide glycol condensate and vegetable oil emulsifiers and polyol lubricant there is added the requisite water to produce an oil-in-water emulsion as for the preferred antioxidant discussed above.

Another alternative embodiment is to use a substituted diphenylamine antioxidant 4,4'-[2-(2-phenyl)-propyl]diphenylamine available from Uniroyal Chemical Corporation under the trade designation "NAUGARD 445" in an amount preferably in the range of about 5 to about 25 weight percent dissolved in acetone used in an amount of around a 1 to 1 ratio with the antioxidant. To this mixture of antioxidant and solvent the emulsifier blend is added by any of the methods discussed in the preferred antioxidant emulsion. The emulsifiers include the condensate of ethylene oxide with hydrophobic bases formed by condensing propylene oxide and propylene glycol which is available from BASF Wyandotte Corporation under the trade designation "Pluronic F-87" having an HLB of 24 and used in an amount of about 0.5 to about 5 weight percent along with another ethylene oxide-propylene oxide glycol condensate available under the trade designation "Pluronic P-65" that has an HLB of 17 and is available in a paste form. Another emulsifier that is used is the polyethoxylated vegetable oil available from GAF under the trade designation "EMULPHOR EL-719" having an HLB of 13.6. To this mixture there is added a requisite amount of water by any of the methods discussed above for the preferred embodiment.

Another alternative embodiment is to use an antioxidant that is a 3:1 condensate of 3 methyl-6-tertiary butyl phenol with crotonaldehyde, available from ICI US, Inc. under the trade designation "TOPANOL CA" in an amount in the range of about 5 to about 25 weight percent of the emulsion. This antioxidant which is a fine white crystalline powder with a melting point of 182.5° C. to 188° C. is dissolved in cyclopentanone which is used in an amount of around a 1 to 1 ratio with the antioxidant. To this mixture there is added an emulsifier blend by any of the methods used in the preferred embodiment where the emulsifier blend comprises an octyl phenoxy polyethoxyethanol emulsifier available from Rohm & Haas Company under the trade designation "TRITON X-100" which is used in an amount of about 1 to about 5 weight percent of the emulsion. Another octyl phenoxy polyethoxyethanol emulsifier that is used is available from Rohm & Haas Company under the trade designation "TRITON X-45", and it is used in the same amounts as the Triton X-100 emulsifer. The X-100 has an HLB of 13.5 and the X-45 has an HLB of 10.4. In addition to the antioxidant, solvent, emulsifier blend mixture an amount of epoxy resin such as Epon 828 epoxy resin available from Shell Chemical Company can be added to the emulsion in an amount of up to about 40 weight percent of the emulsion. This mixture is then emulsified by the indirect method by adding water to invert the oil to an oil-in-water emulsion. The amount of water that is added and the method it is added is similar to that discussed for the preferred embodiment. This emulsion of the antioxidant with the solvent and emulsifiers and epoxy resins allows for the simultaneous emulsification of the antioxidant and the epoxy resin.

Any of these aforementioned oil-in-water emulsions and preferably the emulsion having the octadecyl 3-(3',5'-di-tert-butyl-4-hydroxyphenyl)propionate antioxidant can be formulated into a sizing composition for treating glass fibers. This formulation preferably occurs by adding the oil-in-water emulsion to an aqueous composition containing a coupling agent that is preferably a mixture of coupling agents such as an organo diamino silane coupling agent and an epoxy containing organo silane coupling agent wherein both are present in an amount of about 0.5 to about 10 weight percent of the aqueous sizing composition. To this mixture there is also added film-formers like epoxy-containing resin in an amount of about 0.5 to about 12 weight percent of the aqueous sizing composition. In an alternative embodiment other sizing ingredients may be added like lubricants, such as the Pluracol V-10 lubricant, wetting agents, and additional surfactants and cationic agents. The amount of water in the aqueous sizing composition usually ranges from about 70 to about 99 weight percent of the sizing composition.

The aqueous sizing composition is applied to individual glass fibers during their formation according to the manner illustrated in U.S. Pat. No. 4,027,071 hereby incorporated by reference and the sized glass fibers are subsequently dried to remove the moisture and organic solvent. The antioxidant oil-in-water emulsion used with the aforementioned sizing composition having a mixture of silanes and a film-former reduces the chemical degradation of polymers that are reinforced with these glass fibers, especially at exposures to sever, end use, elevated temperatures. This is particularly beneficial when these sized glass fibers are used to reinforce polyesters such as polybutylene terephthalate.

The aqueous emulsions of the present invention will be further elucidated by making reference to the following examples.

EXAMPLE 1

An emulsion was prepared by the following method. First, 180 grams (8.7 weight percent of the emulsion) of a 3:1 condensate of 3 methyl-6-tertiary butylphenol with crotonaldehyde antioxidant available from ICI U.S. Inc. as Topanol CA antioxidant was dissolved in an epoxy resin solution at 120° F. (49° C.). The solution contained 540 grams (26.2 wt.%) of epoxy resin available from Ciba Products Corporation under the trade designation "Araldite 540 X90" and 100 grams (4.9 wt.%) of methyl ethyl ketone and 140 (6.8 wt.%) grams of trichloroethylene.

Second, two emulsifiers that are condensates of ethylene oxide with hydrophobic bases formed by condensing propylene oxide with propylene glycol were blended into the antioxidant emulsion. The one emulsifier was Pluronic L-35 having an HLB of 18.5 used in an amount of 66 grams (3.2 wt.%) and the other emulsifier was Pluronic F-127 emulsifier that has an HLB of 22 and used in an amount of 33 grams (1.6 wt.%). Both of these emulsifiers are available from BASF Wyandotte Industrial Chemical Group. The emulsifier blend had a combined HLB of 19.6. The two were blended into the antioxidant mixture until the F-127 emulsifier was completely melted.

The blended mixture was cooled before being homogenized in an Eppenbach homogenizer with the slow addition of 1000 grams of water at room temperature. This emulsion could be used in a sizing composition for glass fibers.

EXAMPLE 2

Using the same preparation procedure another emulsion was prepared that had the following formulation:

| | | wt % | grams |
|---|---|---|---|
| A. | Epoxy resin (Araldite 540 X90) | 25.4 | 540 |
| | Antioxidant (Naugard 445) | 8.5 | 180 |
| | trichloroethylene | 6.6 | 140 |
| | methyl isobutyl ketone | 4.7 | 100 |
| | Blended with A was Pluronic Condensate emulsifier | | |
| | L-35 | 5.2 | 110 grams |
| | F-127 | 2.4 | 52 grams |
| | water | 47.1 | 1000 grams |

EXAMPLE 3

Using the same preparation procedure as in Example 1 an emulsion was prepared that had the following formulation:

| | | wt % | gm. |
|---|---|---|---|
| A. | Epoxy resin (Araldete 540X90) | 29.6 | 685 |
| | Antioxidant (Naugard 445) | 7.8 | 180 |
| | Methyl ethyl ketone | 4.3 | 100 |
| | Butyl Cellosolve acetate | 4.3 | 100 |
| | 1,1,1-tri-chloroethane | 6.0 | 140 |
| B. | Nonionic emulsifier (Pluronic L-35) | 3.0 | 70 |
| | Nonionic emulsifier (Pluronic F-108) | 1.6 | 36 |
| | Water | 43.3 | 1000 |

This three solvent blend, dual emulsifier blend yielded an emulsion with good stability.

EXAMPLE 4

Employing the identical preparation procedure as in Example 1 an emulsion was prepared that had the following formulation:

| | | wt % | gm. |
|---|---|---|---|
| A. | Epoxy resin (Araldete 540X90) | 25.4 | 540 |
| | Antioxidant (Naugard 445) | 8.5 | 180 |
| | Methyl carbitol acetate | 9.4 | 200 |
| | methyl ethyl ketone | 4.7 | 100 |
| | Nonionic emulsifier Pluronic L-35 | 3.3 | 70 |
| | Nonionic emulsifier Pluronic F-127 | 1.6 | 35 |
| | Cold Water | 47.1 | 1000 |

The inversion occurred with the addition of 700 grams of water and the entire complement of water was added to produce a stable emulsion.

EXAMPLE 5

An amount of 720 grams, 28.8 weight percent, of the aqueous emulsion of antioxidant tetrakis[methylene 3-(3′,5′-di-t-butyl-4′-hydroxyphenyl)propionate]methane Irganox 1010 was dissolved in 720 grams (25.8 wt%) of cyclohexane. This dissolution occurred at a temperature in the range of 80°–90° F. (26°–33° C.). To this mixture there was blended 45 grams (1.6 wt%) of the nonionic emulsifier Tergitol TMN-6 and 45 grams (1.6 wt%) of the nonionic emulsifier Igepal CO-630 and 65 grams (2.3 wt%) of nonionic emulsifier Triton N-401. The emulsifier blend had an overall HLB of 19.7. To emulsify to an oil-in-water emulsion 1200 grams (42.9 wt%) of water was added with shear mixing. A stable emulsion was produced having a fine to medium particle size distribution with hardly any coarse particles.

EXAMPLE 6

The emulsion of Example 5 was used in preparing a sizing composition that was used to treat glass fibers. The sizing composition contained:

| | wt % | gms. |
|---|---|---|
| Epoxy resin (Genepoxy 370 H55 55% solids) | 8.3 | 2730 |
| Emulsion (30.6% solids) | 6.7 | 2210 |
| Film-former (polyurethane resin Wyandotte X-1042 50% available from BASF Wyandotte) | 24.2 | 7980 |
| diamino organosilane | 9.1 | 3000 |
| water | 18.2 | 6000 |
| epoxy-containing silane | 0.5 | 150 |
| water | 32.8 | 10,800 |
| acetic acid | .18 | 60 |
| | .01 | 5 |

The sizing composition was prepared by hydrolyzing the silanes in the indicated amounts of water and combining the aqueous solutions of silanes. The antioxidant emulsion was combined with the silane mixture and to this mixture there was added the polyurethane resin. The epoxy resin available from General Mills Company was added to the mixture. This sizing composition is hereinafter referred to as Size 1.

The sizing was used to treat K-37 1/0 glass fibers in a wet chop process to produce ⅛" (inch) chopped glass fibers.

EXAMPLE 7

An amount of 313 grams (7.9 weight percent of the emulsion) of antioxidant Naugard 445 was dissolved in acetone. The amount of acetone was 500 grams (12.7 wt%) which gave a 0.6 to 1 antioxidant solvent ratio. This mixture was added to 1250 grams (31.6 wt%) of warm epoxy resin (Epon 828 resin). To this mix there was added 48 grams (1.2 wt%) of the nonionic emulsifier Pluronic F-87 and 82 grams (2.1 wt%) of nonionic emulsifier Pluronic P-65 and 32 grams (0.8 wt%) of nonionic emulsifier Emulphor EL-719. The latter emulsifier is a polyoxyethylated vegetable oil available from GAF Corporation. This gives a total HLB for the emulsion blend of 18.4.

The mix was heated to remove the acetone although the acetone could even be evaporated off before the addition of the emulsifier blend.

Once about 90-95% of the acetone was removed, emulsification was commenced using Eppenbach equipment. The water was added gradually until all of the water was added. The emulsion mix was cooled back to room temperature.

EXAMPLES 8, 9 AND 10

The emulsion of Example 7 was used in preparing three sizing compositions for glass fibers. These compositions are depicted in Table I below.

TABLE I

| Size Formulation | Size 2 gm/wt % | Size 3 gm/wt % | Size 4 gm/wt % |
|---|---|---|---|
| Emulsion concentrate 50% Epoxy Resin/Naugard 445 Antioxidant | 305/8.1 | 310/8.5 | 305/8.3 |
| Film-former: | | | |
| Urea Melamine Resin (Resimene resin Monsanto Chem. Co.) | 36/1.0 | — | — |
| Urethane latex Witcoband W-210 (Witco Chemical Corp.) | 200/5.3 | — | — |
| Urethane latex Nopcothane UOI (Diamond Shamrock Chemical Co.) | — | 100/2.7 | — |
| Urethane latex Wyandotte X-1042H (BASF Wyandotte Corp.) | — | — | 100/2.7 |
| Water | 957/25.5 | 1000/27.3 | 1000/27.3 |
| Water | 2176/58 | 2176/59.4 | 2176/59.5 |
| aminosilane (A-1100 Union Carbide Corp.) | 60/1.6 | 60/1.6 | 60/1.6 |
| Urea | 18/0.5 | 18/0.5 | 18/0.5 |
| Total Solids | 7.1% | 7.0% | 6.84% |

No problems were encountered in using the emulsions in Sizings 2, 3 or 4. These sizing compositions were used to treat glass fibers made from a glass batch marble melter used to make wet chop glass fibers.

EXAMPLE 11

An oil-in-water emulsion of Irganox 1010 antioxidant was prepared by dissolving 160 grams (7.4 wt%) of the antioxidant in 160 grams (7.4 wt%) methyl ethyl ketone at a temperature up to 130° F. (54° C.). To this mixture there was blended 50 grams of POE (4) sorbitan monolaurate (Tween 21 emulsifier from ICI Americas Inc.) and 50 grams of Emulphor EL-719 material, and 50 grams of Pluronic P-65 emulsifier and 50 grams of Pluronic F-87 emulsifier. The emulsifier blend had a combined HLB of 17.

Also blended into the mixture was 640 grams (29.3 wt%) of Epon 828 epoxy resin. The total mixture was emulsified using an Eppenbach mixer with the addition of 1000 grams (46.5 wt%) of water.

The stability of the emulsion is good on storage of 4 hours and 5 days. Although after 5 days of storage some surface film formed which might be due to solvent evaporation since container was open to the atmosphere.

EXAMPLE 12

An oil-in-water emulsion of Irganox 1076 antioxidant was prepared by dissolving 160 grams (7.4 wt%) octadecyl 3-(3',5'-di-tert-butyl-4-hydroxyphenyl)propionate in 160 grams (7.4 wt%) of toluene solvent at a temperature of 80° to 90° F. (26° C. to 33° C.). To this mixture there was added 50 grams of POE (4) sorbitan monolaurate (Tween 21), 50 grams of Emulphor EL-719 material, 50 grams of Pluronic P-65 emulsifier and 50 grams of Pluronic F-87 emulsifier. The emulsifier blend had a combined HLB of 17. An epoxy resin, Epon 828 resin, was stirred into the mixture, and the resultant mixture was emulsified at a temperature of 110° F. (43° C.) with the addition of 1000 grams of water.

Storability and dilutability of the emulsion was good.

EXAMPLE 13

An oil-in-water emulsion of tetrakis(methylene 3-3'5'-di-t-butyl-4'-hydroxyphenyl)propionate methane was prepared with the following formulation and in the following manner. An amount of 480 grams of the antioxidant was dissolved at 120° F. (49° C.) in 480 grams methyl ethyl ketone. Blended with this mixture was 150 grams of POE (4) sorbitan monolaurate (Tween 21), 150 grams of Emulphor EL-719 material and 150 grams of Pluronic P-65 emulsifier and 50 grams of Pluracol V-10, a lubricant. The emulsifier blend had a combined HLB of 17 and the lubricant was added to improve the stability of the emulsion. After these materials were blended 1960 grams of Epon 828 epoxy resin were stirred into the blend. At a temperature of 105° F. (41° C.) the resultant mixture was emulsified with the addition of 6000 grams of water.

The dispersibility and stability of the emulsion was good. The stability was good after two days of storage.

EXAMPLE 14

An oil-in-water emulsion of octadecyl 3-(3',5'-di-tert-butyl-4-hydroxyphenyl)propionate was prepared in the same manner as Example 13. The emulsion had a higher amount of solids, 34 percent. The only exception to the manner of preparation was the dissolving of the antioxidant in the toluene at room temperature. The formulation was:

|  | gms./wt % |
| --- | --- |
| Octadecyl 3-(3',5'-di-tert-butyl-4-hydroxyphenyl) propionate | 480/14.4 |
| toluene | 480/14.4 |
| POE (4) sorbitan monolaurate | 105/3.1 |
| polyethoxylated vegetable oil (Emulphor EL-719) | 105/3.1 |
| Condensates of ethylene oxide and propylene oxide with propylene glycol Pluronic P-65 | 100/2.9 |
| Pluronic F-87 | 100/2.9 |
| polyalkylene polyol (Pluracol V-10) | 50/11.5 |
| Water | 1920/57.5 |

The emulsion blend had a total HLB of 16.8. The emulsion had good stability and dilutability. On storage for 4 hours and two days the emulsion was good.

EXAMPLE 15

An oil-in-water emulsion of an antioxidant of 3:1 condensate of 3 methyl 6 tertiary butylphenol with crotonaldehyde antioxidant was prepared. An amount of 160 grams (6.9 wt%) of the antioxidant was dissolved in 160 grams (6.8 wt%) of cyclopentanone. To this mixture there was blended 100 grams of POE (4) sorbitan monolaurate (Tween 21), and 100 grams of polyethoxylated vegetable oil (Emulphor EL-719). The emulsifier blend had a total HLB of 13.4.

To this blended mixture there was added 655 grams (27.9 wt%) of Epon 828 epoxy resin. The resultant mixture was emulsified with the addition of 1175 grams (50 wt%) of water.

The emulsion had good dispersibility and good storageability for 4 hours and one day.

EXAMPLE 16

An oil-in-water emulsion of octadecyl-3-(3',5'-di-tert-butyl-4-hydroxyphenyl)propionate was prepared. An amount of 288 grams (17.7 wt%) of the antioxidant was dissolved in 288 grams (17.7 wt%) of xylene at around 110° F. (43° C.). To this mixture there was added an emulsifier blend of 18 grams (1.1 wt%) of trimethyl nonyl polyethylene glycol ethers (Tergitol TMN-6 emulsifier available from Union Carbide Corp.), and 18 grams (1.1 wt%) of nonyl phenoxypolyethyleneoxyethanol (Igepal CO630 from GAF Corp.). Also, 18 grams (1.1 wt%) of condensate of ethylene oxide with hydrophobic bases formed by condensing propylene oxide with propylene glycol (Pluronic P-65 emulsifier available from BASF Wyandotte) was combined with 200 grams of warm water at 80° F. (27° C.) and added to the antioxidant mixture. The emulsifier blend had a total HLB of 13.7.

The resulting mixture was emulsified with the addition of 800 grams (49.1 wt%) of water. The emulsion had good dispersibility and storageability.

EXAMPLE 17

The antioxidant tetrakis(methylene-3-3',5'-di-t-butyl-4'-hydroxyphenyl)propionate methane was emulsified in the following manner. An amount of 720 grams (22.7 wt%) was dissolved in a solvent mixture of petroleum solvent Hi-Sol-10 available from Ashland Chemical Co. in an amount of 720 grams (22.7 wt%) and 80 grams (2.5 wt%) of methyl ethyl ketone. The temperature was 150° F. (66° C.) for dissolution in Hi-Sol-10 and the temperature was cooled to 90° F. before the addition of methyl ethyl ketone.

To this mixture there was added 45 grams (1.4 wt%) of trimethyl nonyl polyethylene glycol ethers (Tergitol TMN-6), and 45 grams (1.4 wt%) of nonylphenoxypolyethyleneoxyethanol (Igepal CO-630) and 65 grams (2.0 wt%) of nonylphenoxypolyethoxyethanol (Triton N-401 702) available from Rohm and Haas Co. The emulsifier blend had a combined HLB of 15.3.

The resultant mixture was emulsified with the addition of 1500 grams (47.2 wt%) of water.

EXAMPLE 18

The anti-oxidant which is a three-to-one condensate of 3-methyl,6-tertiarybutylphenol with crotonaldehyde was emulsified by combining 315 grams or 16.8 weight percent of the antioxidant with 500 grams or 26.6 weight percent of cyclohexanone at a temperature of around 104° F. (40° C.). To this mixture there was added an emulsifier blend comprising 32 grams or 1.7 weight percent of polyethoxylated vegetable oil (emulphor EL 719), and 82 grams or 4.4 weight percent of a condensate of ethylene oxide with hydrophobic bases formed by condensing propylene oxide with propylene glycol (Pluronic P-65) and 48 grams or 2.6 weight percent of another condensate of ethylene oxide with hydrophobic bases formed by condensation of propylene oxide with propylene glycol (Pluronic F-87). The emulsion blend has a total HLB of 18.4. The mixture was cooled back to 80° F. and emulsified while adding 900 grams or 47.9 weight percent water.

EXAMPLE 19

Another formulation of the 3:1 condensate of 3-methyl,6-tertiarybutylphenol with crotonaldehyde antioxidant prepared in a similar manner to that of Example 18 is as follows:

| Antioxidant | 315 Grams | 20 Weight Percent |
| --- | --- | --- |
| Cyclohexanone Solvent | 350 Grams | 22.2 Weight Percent |
| Polyethoxylated Vegetable Oil | 22 Grams | 1.4 Weight Percent |
| Condensate of ethylene Oxide with hydrophobic bases formed by condensing propylene oxide with propylene glycol (Pluronic P-65) | 54 Grams | 3.4 Weight Percent |
| Another Condensate of ethylene Oxide with hydrophobic bases formed by condensing propylene oxide with propylene glycol (Pluronic F-77) | 16 Grams | 1 Weight Percent |
| Pluronic F-77 Emulsion in Water | 15 Grams in 500 Grams | 1 Weight Percent in 31.8 Weight Percent |
| Water to Complete Emulsion | 300 Grams | 19.1 Weight Percent |

The emulsifier that is a condensate of ethylene oxide with hydrophilic basis formed by condensing propylene oxide with propylene glycol and available as Pluronic F-77 was added to the anti-oxidant mixture by adding a first portion of the emulsifier directly to the antioxidant mixture containing the antioxidant, solvent and other emulsifiers which is preferably a fifty-fifty split and then adding the second portion of the emulsifier to water and adding the diluted emulsifier to the antioxidant mixture.

The emulsion had a thin viscosity and blue white coloration.

EXAMPLE 20

An emulsion of octadecyl 3-(3'5'-di-tert-butyl-4-hydroxyphenyl) proprionate was prepared by dissolving 160 grams or 20.8 weight percent of the antioxidant in 160 grams or 20.8 weight percent of a petroleum solvent (Hi Sol 10) at room temperature but with the use of heat to assist solvency. To this mixture there was added an emulsifier blend of 25 grams or 3.2 weight percent of POE (4) sorbitan monolaurate Tween 21 emulsifier, and 12.5 grams or 1.6 weight percent of condensate of ethylene oxide with hydrophilic basis formed by condensing propylene oxide with propylene glycol (Pluronic P-65) and an amount of 12.5 grams or 1.6 weight percent of another condensate of ethylene oxide with hydrophilic basis formed by condensing propylene oxide with propylene glycol (Pluronic F-87) dilluted with 100 grams or 13 weight percent of water. This mixture was emulsified with the addition of 300 grams or 39 weight percent of water. The emulsion had a thin viscosity and blue white coloration.

EXAMPLE 21

The emulsion of Example 13 was prepared into a sizing composition for treating glass fibers by taking 4,080 grams of a 32 percent concentrate of the emulsion and combining it with 1,060 grams of a polyurethane latex film former available for BASF Wyandotte Corp. under the trade designation WYANDOTTE X-1042H and with 4000 grams of warm water at 110° F. (43° C.). To this firt mixture there was also added 5000 grams of water and 189 grams of gamma-aminopropyltriethoxysilane. The amount of the anti-oxidant emulsion in the sizing composition was about 9.1 weight percent based on the 32 percent concentration of the antioxidant emulsion. The amount of the film former was 3.7 weight percent based on the 50 percent concentrated polyurethane film former and the amount of the silane in the sizing composition was 1.3 weight percent.

The sizing composition had a total solids of 32.3 percent.

The sizing composition was used to treat glass fibers that were formed by attenuation from molten streams of glass from small orifices in a bushing which were prepared by a conventional method. An example of such a conventional method can be found in U.S. Pat. No. 4,027,071 hereby incorporated by reference. The sized glass fibers were dried and chopped into one-eighth inch and three-sixteenth inch lengths.

EXAMPLE 22

The antioxidant emulsion of Example 14 was used to prepare a sizing composition for treating glass fibers. The sizing composition was formulated as follows:

| (A) | | |
|---|---|---|
| Anti-oxidant emulsion 34.3 percent concentrate | 3,794 Grams | 25.6 Wet Weight Percent |
| Polyurethane latex film former (Wyandotte X-1042H) (50% solids) | 1,059 Grams | 7.1 Wet Weight Percent |
| Water, warm, around 110° F. | 4,800 Grams | 32.3 Wet Weight Percent |
| (B) | | |
| Water | 5,000 Grams | 33.7 Wet Weight Percent |
| Gamma-aminopropyltri-ethoxysilane | 189 Grams | 1.3 Wet Weight Percent |
| Acetic acid adjustment of ph to be in the range of about 6.5 to about 7.0 | | |

The sizing composition had 13 percent solids. This sizing composition, hereinafter referred to as Size #5, was used to treat glass fibers that were formed by attenuation of molten streams of galss from small orifices in a bushing. An example of a conventional method for producing glass fibers is found in U.S. Pat. No. 4,027,071. The gathered sized glass fiber strands were dried and chopped into ⅛ inch and 3/16 inch lengths. The chopped strands were tested for loss on ignition and gave a 1.29 percent LOI.

EXAMPLE 23

An oil-in-water emulsion was prepared in a manner similar to that of Example 5 having the following formula:

| | Grams | Wt. % |
|---|---|---|
| octadecyl 3-(3', 5'-ditert butyl-4'-hydroxyphenyl propionate antioxidant | 720 | 25.8 |
| Amyl acetate | 720 | 25.8 |
| Trimethyl nonyl polyethylene glycol ether (Tergetol TMNG) | 45 | 1.6 |
| Nonylphenoxy polyethoxy ethanal (Triton N-401) | 65 | 2.3 |
| Nonylphenoxy poly (ethylene oxy) ethanol (Igepal CO-630) | 45 | 1.6 |
| Cold Water | 1,200 | 42.9 |

This emulsion was prepared into a sizing composition in a similar manner to that of Example 6. The sizing composition had the following formulation:

| | Grams | Wt. % |
|---|---|---|
| Epoxy resin (Genepoxy 370 H-55 available from General Mills Co. 55% solids) | 2,730 | 9.0 |
| Antioxidant emulsion 27.6% solids | 2,210 | 7.3 |
| polyurethane resin (Wyondotte X-1042) | 7,980 | 26.4 |
| Water | 6,000 | 18.2 |
| gamma-aminopropyltri ethoxysilane | | |
| Water | 10,800 | 35.8 |
| Acetic Acid | 5 | .02 |
| epoxy - containing silane | 150 | .5 |

This sizing composition was used to treat glass fibers in a manner similar to that of Example 21. The sized glass fibers were dried and chopped into one-eighth inch and three-sixteenth inch lengths.

Dried, sized glass fibers treated with sizing compositions #1, #2, #3, #4 and #5 were used to reinforce polybutylene terephthalate. The reinforced polymer was prepared by using 30 parts of the various sized glass fibers in the chopped form and 70 parts of polymer. This mixture was injection molded in a Newbury injection machine in a one ounce shot.

The reinforced polymeric materials were tested in the accelerated aging test known as thermal aging. This test is conducted by placing tensile bars of the specimen in a high velocity air circulating oven at a temperature of 185°±1° C. for tests of Table II. Specimens are removed at various time intervals and tested for the mechanical property of tensile strength measured in pounds per square inch (psi) on an Instron machine.

Polymeric material reinforced with dried sized glass fibers with sizing composition 1, 2, 3, 4, and 5 were tested in this manner. These reinforced polymeric materials were compared to reinforced materials having commercially available glass fibers. The results are shown in Table II.

was added to the polybutylene terephthalate and this polymer was compounded with 30 parts of chopped glass fibers commercially available from PPG Industries, Inc. The antioxidant added to the polymer represents an extra amount to that amount which is already present in the commercial polymer. The glass fiber polybutylene terephthalate antioxidant mixture was molded by injection molding in the same Newbury

TABLE II

Thermal Aging Tests
Specimen Having Specified Size

| Time at thermal aging | Commercial #1 Tensile strength (psi) | Commercial #2 Tensile strength (psi) | Size 1 Tensile strength (psi) | Size 2 Tensile strength (psi) | Size 3 Tensile strength (psi) | Size 4 Tensile strength (psi) | Size 5 Tensile strength (psi) |
|---|---|---|---|---|---|---|---|
| Original | 21,161 | 19,139 | 19,629 | 21,381 | 22,204 | 22,655 | 19,154 |
| One Week | 23,436 | 21,332 | 20,719 | 24,761 | 23,608 | 24,550 | 21,904 |
| Two Weeks | 25,226 | 21,551 | 21,428 | 25,616 | 23,480 | 25,785 | 21,962 |
| Three Weeks | 23,954 | 21,514 | 20,703 | 23,830 | 24,469 | 25,017 | 21,046 |
| Four Weeks | 22,061 | 19,488 | 20,651 | 22,717 | 22,912 | 24,863 | 20,680 |
| Five Weeks | 19,717 | 17,515 | 20,329 | 20,672 | 22,618 | 24,109 | 18,402 |
| Six Weeks | 17,988 | 17,480 | 19,384 | 20,361 | 20,657 | 22,356 | 19,211 |
| Seven Weeks | 13,791 | 16,138 | 17,423 | 14,159 | 14,496 | 16,199 | 17,602 |
| Eight Weeks | 15,932 | 14,377 | 16,915 | 15,654 | 16,857 | 18,599 | 16,555 |
| Nine Weeks | 13,416 | 14,694 | 16,510 | 12,828 | 15,218 | 19,515 | 15,639 |
| Ten Weeks | 12,886 | — | — | 12,491 | 14,392 | 11,478 | — |

Table II shows the reinforced polybutylene terephthalate that is reinforced with glass fibers treated with a sizing composition having the antioxidant emulsion of the present invention outperforms the commercial material. This better performance can be higher original and first couple weeks tensile strength values and similar values after several weeks and/or similar original values and higher values after several weeks.

EXAMPLE 24-DRY BLENDING EXAMPLES

In addition to testing the mechanical properties after accelerated aging tests for fiber glass reinforced polybutylene terephthalate where the glass fibers were treated with a sizing composition containing the antioxidant emulsion, dry blending accelerated aging studies were conducted. In the dry blending studies, the antioxidant molder used in the previous examples.

The tensile bars prepared by injection molding were subjected to accelerated aging in a similar manner as previous examples at a temperature usually of 200° C.±1° C. for test 1 and 2 and 190° C.±1° C. for tests 3–6 of Table III. Table III shows results of the mechanical property of tensile strength in pounds per square inch for the samples after various times under the accelerated aging conditions. Specimens 4, 5 and 6 were compared with specimens 2 and 3 that had glass fiber reinforced polybutylene terephthalate where the glass fibers used are commercially available from PPG industries, Inc. Specimen number 1 was prepared in the same manner as the other speciments except no glass fibers were incorporated into the polymer.

TABLE III

Thermal Aging Tensile Strength
for Dry Blending Studies
Tensile Strengths (in psi) at specified time
of Thermal Aging

| Specimen | Original | First Week | Second Week | Third Week | Fourth Week | Fifth Week |
|---|---|---|---|---|---|---|
| (1) Molded polybutylene terephthalate (PBT) No glass | 7,875 | 1,386 | | | | |
| (2) PBT and 30 parts commercially available PPG Industries, Inc. chopped glass fiber | 21,400 | 10,383 | | | | |
| (3) Specimen 2 70 PBT and glass fibers (30) | 20,348 | 14,343 | 7,919 | | | |
| (4) Specimen #2 plus 0.25 parts of tetrakes (methylene 3-(3', 5'-di-(butyl-4-hydroxyphenyl) propionate) methane (Iganox 1010) | 20,083 | 19,163 | 12,701 | 8,625 | | |
| (5) Specimen #2 plus 0.75 parts of Iganox 1098 per 99.25 parts of PBT and sized glass fibers (1098 is N,N' hexomethylene bis(3,5-di-tert-butyl-4-hydroxy-hydrocinnamamide | 20,449 | 19,740 | 16,258 | 13,192 | 10,293 | 10,000 |
| (6) Specimen #2 plus 0.75 parts of 4, 4'-(2-(2-phenyl) propyl) disphenyl-amine (Naugard 445) | 21,638 | 21,547 | 15,620 | 14,884 | 13,344 | 12,237 |

TABLE III-continued

Thermal Aging Tensile Strength
for Dry Blending Studies
Tensile Strengths (in psi) at specified time
of Thermal Aging

| Specimen | Original | First Week | Second Week | Third Week | Fourth Week | Fifth Week |
|---|---|---|---|---|---|---|
| per 99.25 parts of PBT and sized chopped glass fibers | | | | | | |

Table III shows the improved property of tensile strength at longer times under thermal aging conditions obtained by addition of extra antioxidant that has low volatility, good heat stability and good polymer compatibility.

The foregoing has described oil-in-water antioxidant emulsions, aqueous treating compositions for treating fibrous reinforcement containing the antioxidant emulsions, and a method of reducing chemical degradation of polymers reinforced with fibrous materials. The aqueous emulsions comprise the antioxidant, organic solvents, one or more emulsifiers having an HLB in the range of about 12 to about 27. The aqueous treating solutions for treating fibrous materials to be used as reinforcement in polymers, particularly glass fibers, comprises the antioxidant emulsion along with a film former and coupling agent although other sizing ingredients well known to those skilled in the art may also be used. The method of reducing the amount of chemical degradation of reinforced polymers, wherein the chemical degradation is due to an interaction between the chemistry and/or reaction and/or thermal decomposition products thereof of the reinforcement and the polymer involves the addition of an amount of antioxidant in excess of three parts per hundred parts of resin to the polymer or by adding an amount of antioxidant in an oil-in-water emulsion in the range of about 5 to about 60 weight percent of the emulsion to the aqueous treating solution for the fibrous materials.

I claim:

1. An aqueous sizing composition for treating glass fibers to provide additional protection against degradation of polymer reinforced with the treated glass fibers, comprising:
   (a) about 0.5 to about 15 weight percent of an oil-in-water emulsion of an antioxidant having low volatility and good thermal resistance, organic solvent having a boiling point above the temperature of processing glass fibers but low enough to enable the solvent to be vaporized at the temperature of drying glass fibers and having a kauri-butanol value in the range of about 10 to about 50 for the antioxidant that is substantially aliphatic and about 50 to about 100 for the antioxidant that is substantially aromatic and an emulsifier blend of at least two emulsifiers selected from the group of anionic, cationic, and nonionic having an HLB in the range of about 12 to about 27,
   (b) a film-former in an amount in the range of about 0.5 to about 15 weight percent,
   (c) a coupling agent in an amount of about 0.5 to about 10 weight percent, and
   (d) water in an amount to give a total amount of water in the aqueous sizing composition in the range of about 70 to about 99 weight percent.

2. The sizing composition of claim 1 which includes a lubricant in an amount of about 0.001 to about 1 weight percent.

3. The sizing composition of claim 1 wherein the film-former is a 1,-2-epoxy-containing resin and the coupling agent is an aminosilane.

4. Glass fibers treated with the sizing composition of claim 1.

5. Glass fibers treated with the sizing composition of claim 3.

6. Sizing composition of claim 1 wherein the ratio of antioxidant to solvent is about 0.5 to about 1.5.

7. Composition of claim 1 wherein the antioxidant is selected from hindered phenolic antioxidants and diarylamine antioxidants having low volatility of less than 20 percent weight loss as measured by thermal gravimetric analysis.

8. Composition of claim 1, wherein the antioxidant is octadecyl-3-(3',5'-di-tert-butyl-4-hydroxyphenol)propionate and the organic solvent is xylene.

9. Composition of claim 1, wherein the antioxidant is tetrakis (methylene-3-3',5'-di-tert-butyl-4'-hydroxyphenol)propionate methane and the solvent is methyl ethyl ketone.

10. The composition of claim 1, wherein the antioxidant is the substituted diphenylamine 4,4'-[2-(2-phenyl)-propyl]diphenylamine and the solvent is acetone.

11. The composition of claim 1 wherein the antioxidant is a three to one condensate of 3-methyl; 6-tertiarybutylphenol with crotonaldehyde and the solvent is cyclopentanone.

12. The composition of claim 1, wherein the emulsifier comprises trimethyl nonylpolyethyleneglycol ethers having an HLB of 11.7 and nonyl phenoxy polyethyleneoxyethanol having an HLB of 13 and condensate of ethyleneoxide with hydrophobic bases formed by condensing polypropylene oxide and polypropylene glycol having an HLB of 16.5.

13. The composition of claim 1, wherein the emulsifier blend is comprised of polyethoxylated vegetable oil having an HLB of 13.6, condensate of ethylene oxide with hydrophobic bases formed by condensing propylene oxide with propylene glycol having an HLB of 24 and polyoxyethylene (4) sorbitan monolaurate having an HLB of 13.3.

14. The composition of claim 1, wherein the emulsifier comprised of condensate of ethylene oxide with hydrophobic bases formed by condensing propylene oxide with propylene glycol having an HLB of 24 and a condensate of ethylene oxide with hydrophobic bases formed by condensing propylene oxide with propylene glycol having an HLB of 17 and polyethoxylated vegetable oil having an HLB of 13.6.

15. The composition of claim 1, wherein the emulsion blend is comprised of octylphenoxypolyethoxyethanol having an HLB of 13.5 and octylphenoxypolyethoxyethanol having an HLB of 12.5.

16. The composition of claim 3, wherein an epoxy resin is present in the emulsion in an amount in the range of up to about 40 weight percent of the emulsion to act as a carrier for the antioxidant.

17. The composition of claim 1, wherein a polyalkylene polyol is present in the emulsion in an amount in the range of about 1 to about 5 weight percent to assist in stabilizing the emulsion.

18. Method of preparing an aqueous sizing composition for glass fibers, comprising:
   I. preparing an aqueous antioxidant emulsion by:
      (a) mixing an amount of about 5 to about 60 weight percent of one or more hindered phenol or diphenyl amine antioxidants having a weight loss of less than about 20 weight percent in thermal gravimetric analysis with one or more organic solvents in a ratio of about 0.19 to about 1.5 antioxidants to solvent, where the solvent has a kauri-butanol value of about 10 to about 50 when the antioxidant is substantially aliphatic and of about 50 to about 100 when the antioxidant is substantially aromatic;
      (b) combining the resulting mixture from (a) with an emulsifier blend selected from one or more nonionic emulsifier or one or more anionic emulsifier or mixtures thereof wherein the emulsifier blend has a hydrophilic lipophilic balance in the range of about 12 to about 27 and;
      (c) adding an amount of water in the range of about 70 to about 99 weight percent of the emulsion.
   II. hydrolyzing one or more silane coupling agents,
   III. combining the aqueous antioxidant emulsion with the one or more hydrolyzed silane coupling agents,
   IV. add one or more film former, and
   V. dilute with water to the desired total solids content.

19. Method of claim 18 wherein the silane coupling agents are selected from the group consisting of aminosilane coupling agents and epoxidized silane coupling agents.

20. Method of claim 18 wherein the film former is selected from the group consisting of 1,2-epoxy resins, urea melamine resins, and urethane latices or mixtures or blends thereof.

* * * * *